UNITED STATES PATENT OFFICE.

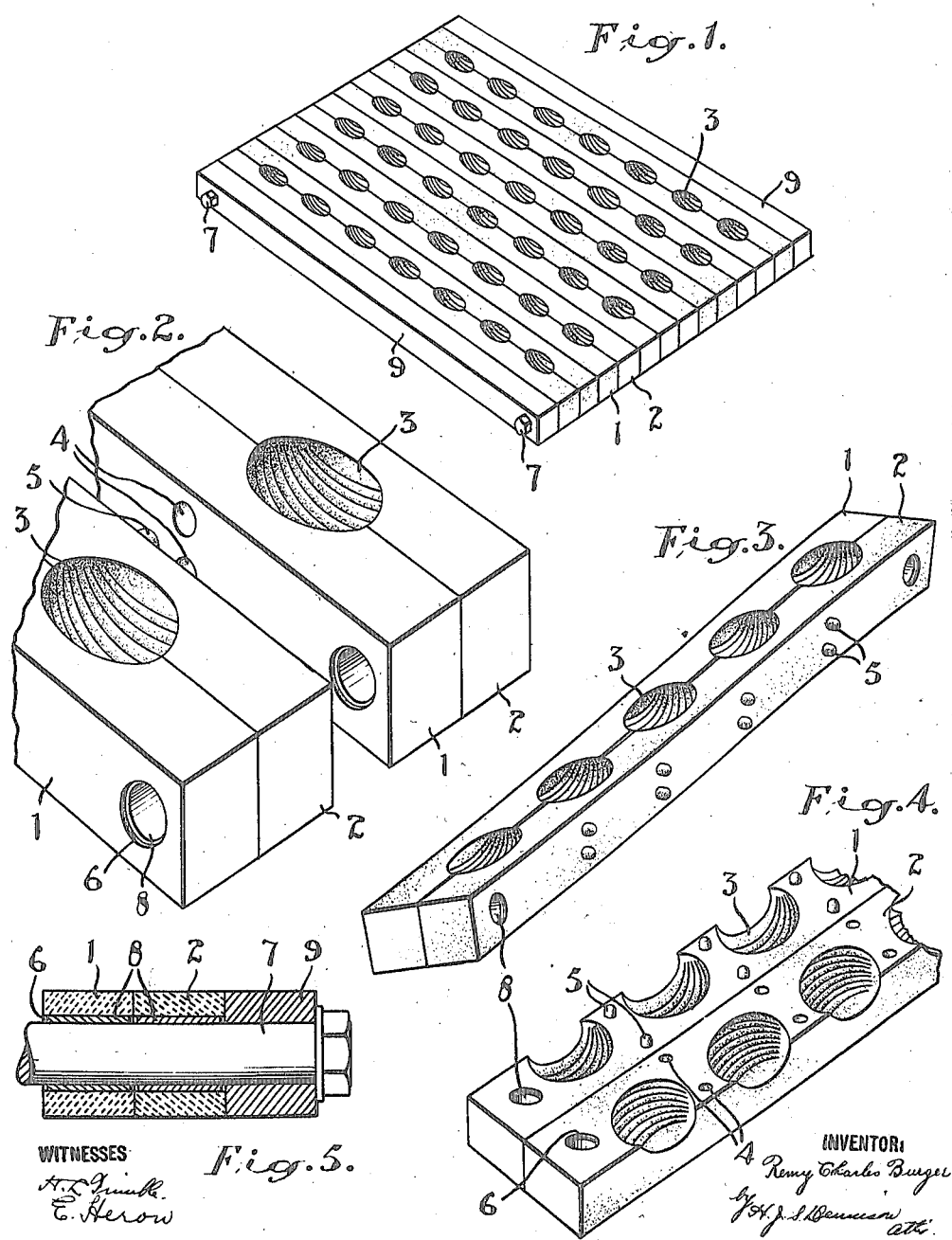

REMY CHARLES BURGER, OF TORONTO, ONTARIO, CANADA.

CONFECTIONERY-MOLD.

1,207,852.

Specification of Letters Patent.  Patented Dec. 12, 1916.

Application filed October 30, 1914. Serial No. 869,373.

*To all whom it may concern:*

Be it known that I, REMY CHARLES BURGER, a citizen of Switzerland, and resident of the city of Toronto, county of York, Province of Ontario, in the Dominion of Canada, have invented certain new and useful Improvements in Confectionery-Molds, described in the following specification and illustrated in the accompanying drawings, that form part of the same.

The principal objects of the invention are, to facilitate the production of molded confectionery, effecting a very considerable saving in labor, to produce filled chocolate confections without dipping, to eliminate the handling of the confections during manufacture, thereby rendering the manufacture thereof perfectly sanitary, and to effect a very considerable saving in the cost of production of such goods.

A further and important object of the present invention is to produce filled chocolates in a mold.

The principal feature of the invention consists in forming a divided mold of flexible material so that the molded confection is released from the mold without being broken.

In the drawings, Figure 1 is a perspective view of a mold constructed in accordance with this invention, showing the separable sections clamped together in the form of a solid block. Fig. 2 is an enlarged perspective view of a portion of a pair of mold sections slightly separated, the one from the other. Fig. 3 is a detail perspective view of a single mold showing the manner in which the flexible divided mold may be twisted in order to release the molded confections. Fig. 4 is a perspective view of a portion of one of the molds with the sections separated and turned outwardly. Fig. 5 is an enlarged vertical cross sectional view through one of the molds and the end block showing the fastening bolt and spacing sleeves in the molds.

Like numerals of reference indicate corresponding parts in each figure.

Referring to the drawings, 1 and 2 are the mold sections adapted to be fitted together in pairs and in their meeting faces having the shaped mold pockets 3 which may be of any desirable design. These pockets are placed in the upper portions of the members 1 and 2 and open into the top thereof to allow of the material to be molded being poured in. Each of the mold sections is formed with the holes 4 preferably arranged in vertical pairs on one side and with the pins 5 on the opposite side, said pins being arranged to register with the holes of the adjacent mold section and to enter said holes and thereby securely hold the several sections together practically in a solid block. Each mold is provided with a plurality of molding pockets and the pins 5 are arranged between the pockets, that is, in the solid portions of the members 1 and 2.

6 are holes extending transversely through the members 1 and 2 adjacent to the ends and arranged in horizontal alinement and adapted to receive the clamping bolts 7 which are passed through the entire set of molds at each end.

8 are metal ferrules arranged within the holes 6 and are of slightly shorter length than the transverse thickness of the mold section. These ferrules encircle the clamp bolts 7 and serve as effective stops to obviate the too tight clamping of the mold sections.

9 are the end clamp bars through which the bolts 7 are inserted. These bars are preferably all of metal and are provided with pins 5 and holes 4 respectively to engage with the corresponding molds or mold sections that may fit thereagainst. The molds are preferably formed of rubber material having the half mold pockets 3 molded therein and these pockets are coated with a surfacing of a suitable non-solvent and glazing material, such as celluloid which will facilitate the removal of the chocolates or other confections from the molds by preventing adhesion. This material is also sufficiently flexible to allow the molds to be twisted or bent to a considerable degree without fracture and further glosses the surfaces of the confections.

In the use of this invention a set of molds is arranged into a block as illustrated in Fig. 1, the bolts 7 extending through the metal end strips 9 and these bolts are tightened up sufficiently to draw the meeting faces of the mold sections 1 and 2 together sufficiently tight so that there will be no opening whatsoever at the division in the mold. The molds being made of a flexible material may be compressed to effect this result which obviates the appearance of a fin upon the molded article. Another and very important feature in reference to the flexibility or compressibility of the mold sections is that the material of the mold is under compression when filled so that upon the slackening of the fastening bolts the expansion of the mold will release the molded article.

The pockets of the mold are filled in any suitable manner with the chocolate or other coating material and the mold block is then inverted to allow the surplus material not adhering to the walls to run out. The surface of the mold pockets is thus coated with a coating of the surface material of the finished product leaving a central opening which opening may then be filled with any desirable filling material and when the filling has been placed therein the top of the mold is covered with more of the surfacing material to seal the filling material. When the materials have been allowed to stand in the molds for a sufficient length of time to cool and harden, the clamping bolts 7 are then removed and upon the release of the compression of the bolts the expansible material of the molds expands and separates the mold surface from the molded material. The mold sections are then separated in pairs and the ends of these sections are grasped in the hands and are preferably given a slight twist as shown in Fig. 4 which effects a further release of the molded articles and the mold is then inverted and the two sections separated thus delivering the molded articles upon the flat bottom sides. The whole operation of making the confections is performed without the material from which the confections are made being touched by the hands, the filling of the molds being accomplished by the use of special filling machinery; consequently the goods are produced in quantity under extremely sanitary conditions and further the utilization of soft or liquid materials for the centers of hard coated confections may be effected as readily as harder materials and at no increase in cost. It will also be readily understood that a great variety of fancy shapes and designs may be produced with a mold such as described which cannot at present be made and by reason of the compressibility and flexibility of the molds they can be released from the molds without breakage.

What I claim as my invention is:—

1. A confectionery mold, comprising, a plurality of strips of compressible elastic material having pockets arranged in the meeting faces of adjacent pairs and forming molds, means for supporting the said strips throughout their length, rigid end strips, and fastening bolts extending transversely through said compressible and end strips adjacent to the ends and adapted to compress and bind the mold sections together during the molding.

2. A confectionery mold, comprising, a plurality of strips of flexible material having pockets arranged in the meeting faces of adjacent pairs and forming molds, said strips having transverse orifices therethrough adjacent to the ends and arranged in alinement, ferrules arranged within said orifices of a length slightly shorter than the width of the strip, binding bolts extending through the ferrules in said strips, and solid end bars adapted to be clamped by said binding bolts against said mold sections to hold them together in a state of compression during the molding.

3. A confectionery mold, comprising, a plurality of flexible strips, each having pockets formed in the adjacent faces and registering to form molds, each of said strips having a plurality of sockets extending along one face thereof and the adjacent strip having projecting pins adapted to enter said sockets to maintain the flexible strips in a common plane, and means for temporarily compressing and binding said strips together during molding.

Signed at the city of Toronto, county of York, Ontario, Canada, this 19th day of October, 1914.

REMY CHARLES BURGER.

Witnesses:
H. L. TRIMBLE,
D. S. TOVELL.